US012023291B2

(12) United States Patent
Soller et al.

(10) Patent No.: US 12,023,291 B2
(45) Date of Patent: Jul. 2, 2024

(54) LOCK ASSEMBLY FOR USE WITH AN INVERSION APPARATUS

(71) Applicant: Expectations, LLC, Bonney Lake, WA (US)

(72) Inventors: Nicholas M. Soller, Orting, WA (US); Christopher H. Leier, Lake Tapps, WA (US); Darrin M. Swagel, St. Louis Park, MN (US); Ryan B. Keehnel, Orting, WA (US)

(73) Assignee: Expectations, LLC, Bonney Lake, WA (US)

( * ) Notice: Subject to any disclaimer, the term of this patent is extended or adjusted under 35 U.S.C. 154(b) by 287 days.

(21) Appl. No.: 17/836,186

(22) Filed: Jun. 9, 2022

(65) Prior Publication Data

US 2023/0404835 A1 Dec. 21, 2023

(51) Int. Cl.
*A61H 1/02* (2006.01)

(52) U.S. Cl.
CPC ... *A61H 1/0229* (2013.01); *A61H 2201/0176* (2013.01); *A61H 2201/1623* (2013.01); *A61H 2201/1633* (2013.01); *A61H 2201/164* (2013.01); *A61H 2203/0431* (2013.01); *A61H 2203/0493* (2013.01)

(58) Field of Classification Search
CPC ............ A63B 21/00047; A63B 21/005; A63B 21/0054; A63B 21/00185; A63B 2023/006; A63B 2023/0205; A63B 2023/0211; A63B 2023/0222; A61H 2201/1676; A61H 2201/1623; A61H 2201/1633; A61H 2201/164
See application file for complete search history.

(56) References Cited

U.S. PATENT DOCUMENTS 5,697,628 A * 12/1997 Spear ........................ A61G 5/12 297/487
6,030,032 A * 2/2000 Tseng ..................... A47C 1/027 297/38
D432,600 S 10/2000 Szabo et al.
6,464,296 B2 * 10/2002 Sumner ................ A61H 1/0292 297/326
9,486,382 B1 * 11/2016 Boss .................. A63B 21/4033

(Continued)

OTHER PUBLICATIONS

Stamina Products, Inc., in Line Inversion Chair Owner's Manual, Model 55-1550, 22 pages, 2016.

*Primary Examiner* — Zachary T Moore
(74) *Attorney, Agent, or Firm* — Dicke, Billig & Czaja, PLLC

(57) ABSTRACT

A lock assembly for use with an inversion apparatus includes a ratchet plate, a position lock pawl, and a safety lock pawl. The ratchet plate is operatively connected to a first tube portion and is accessible through a slot in a second tube portion of the inversion apparatus' securing assembly. The position lock pawl is pivotally connected to the second tube portion to selectively engage the ratchet plate through the slot. The safety lock pawl is pivotally connected to the second tube portion. The safety lock pawl does not engage the position lock pawl when the user support is in the loading position and is configured and arranged to pivot relative to the second tube portion as the user support moves from the loading position into the inverted position to engage the position lock pawl.

22 Claims, 11 Drawing Sheets

(56) References Cited

U.S. PATENT DOCUMENTS

| | | | | |
|---|---|---|---|---|
| 2006/0030466 | A1* | 2/2006 | Chen | A61H 1/0218 482/145 |
| 2009/0249589 | A1* | 10/2009 | Wu | A61H 1/0218 24/457 |
| 2010/0049097 | A1* | 2/2010 | O'Brien | A61H 1/0244 601/1 |
| 2021/0100711 | A1* | 4/2021 | Hsieh | A61H 1/0229 |
| 2023/0017762 | A1* | 1/2023 | Flores | A61H 1/0222 |

* cited by examiner

LOCK ASSEMBLY FOR USE WITH AN INVERSION APPARATUS

BACKGROUND

Inversion apparatus, including inversion tables and inversion chairs, are commonly used to decompress users' spines, and these apparatus help alleviate tightness and pain. Inversion chairs are especially beneficial for users with limited mobility or users who cannot use an inversion table. Inversion chairs also provide a flatter lumbar position for the users and provide a different type of a stretch from an inversion table. Some inversion chairs use seat belts or lap bars to secure the chairs to the users. It is desired to have an inversion chair with a securing mechanism that is comfortable, secure, and easy to use.

For the reasons stated above and for other reasons stated below, which will become apparent to those skilled in the art upon reading and understanding the present specification, there is a need in the art for a lock assembly for use with an inversion apparatus, preferably an inversion chair.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

In one embodiment, a lock assembly for use with an inversion apparatus includes a ratchet plate, a position lock pawl, and a safety lock pawl. The inversion apparatus has a securing assembly operatively connected to a user support. The securing assembly has a first tube portion slidably connected to a second tube portion. The second tube portion has a slot providing access to the first tube portion. The user support is configured and arranged to move between a loading position and an inverted position. The ratchet plate is operatively connected to the first tube portion and is accessible through the slot in the second tube portion. The position lock pawl is pivotally connected to the second tube portion to selectively engage the ratchet plate through the slot. The safety lock pawl is pivotally connected to the second tube portion. The safety lock pawl does not engage the position lock pawl when the user support is in the loading position and is configured and arranged to pivot relative to the second tube portion as the user support moves from the loading position into the inverted position to engage the position lock pawl when the user support is in the inverted position thereby preventing the position lock pawl from disengaging the ratchet plate when the user support is in the inverted position.

In one embodiment method, a lock assembly is used with an inversion apparatus. The inversion apparatus has a securing assembly operatively connected to a user support. The securing assembly has a first tube portion slidably connected to a second tube portion. The second tube portion has a slot providing access to the first tube portion. The lock assembly has a ratchet plate operatively connected to the first tube portion and is accessible through the slot in the second tube portion. A position lock pawl is pivotally connected to the second tube portion to selectively engage the ratchet plate through the slot, and a safety lock pawl is pivotally connected to the second tube portion. The user support is configured and arranged to move between a loading position and an inverted position. The method comprises sitting on the user support, pushing the first tube portion into the second tube portion in a first direction thereby causing the position lock pawl to pivot and move relative to teeth of the ratchet plate to a desired position on the ratchet plate, wherein the ratchet plate and the position lock pawl are configured and arranged to allow the first tube portion to move in the first direction and prevent the first tube portion to move in an opposite second direction, and moving the user support from the loading position into the inverted position, wherein the safety lock pawl does not engage the position lock pawl when the user support is in the loading position and is configured and arranged to pivot relative to the second tube portion as the user support moves from the loading position into the inverted position to engage the position lock pawl when the user support is in the inverted position thereby preventing the position lock pawl from disengaging the ratchet plate when the user support is in the inverted position.

In one embodiment, an inversion apparatus comprises a user support, a securing assembly, a ratchet plate, a position lock pawl, and a safety lock pawl. The user support is configured and arranged to move between a loading position and an inverted position. The securing assembly is operatively connected to the user support. The securing assembly has a first tube portion slidably connected to a second tube portion. The second tube portion has a slot providing access to the first tube portion. The ratchet plate is operatively connected to the first tube portion and is accessible through the slot in the second tube portion. The position lock pawl is pivotally connected to the second tube portion to selectively engage the ratchet plate through the slot. The safety lock pawl is pivotally connected to the second tube portion. The safety lock pawl does not engage the position lock pawl when the user support is in the loading position and is configured and arranged to pivot relative to the second tube portion as the user support moves from the loading position into the inverted position to engage the position lock pawl when the user support is in the inverted position thereby preventing the position lock pawl from disengaging the ratchet plate when the user support is in the inverted position.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

DETAILED DESCRIPTION

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Embodiments of the disclosure generally provide an inversion apparatus, preferably an inversion chair, with a securing assembly that is comfortable, secure, and easy to use. The securing assembly is quickly and easily tightened, preferably just by pushing downward on the securing assembly, and is quickly and easily released, preferably by pushing a release lever to disengage a position lock pawl from a ratchet member. During use, an automatic safety lock pawl prevents accidental release of the position lock pawl.

Figure 4:
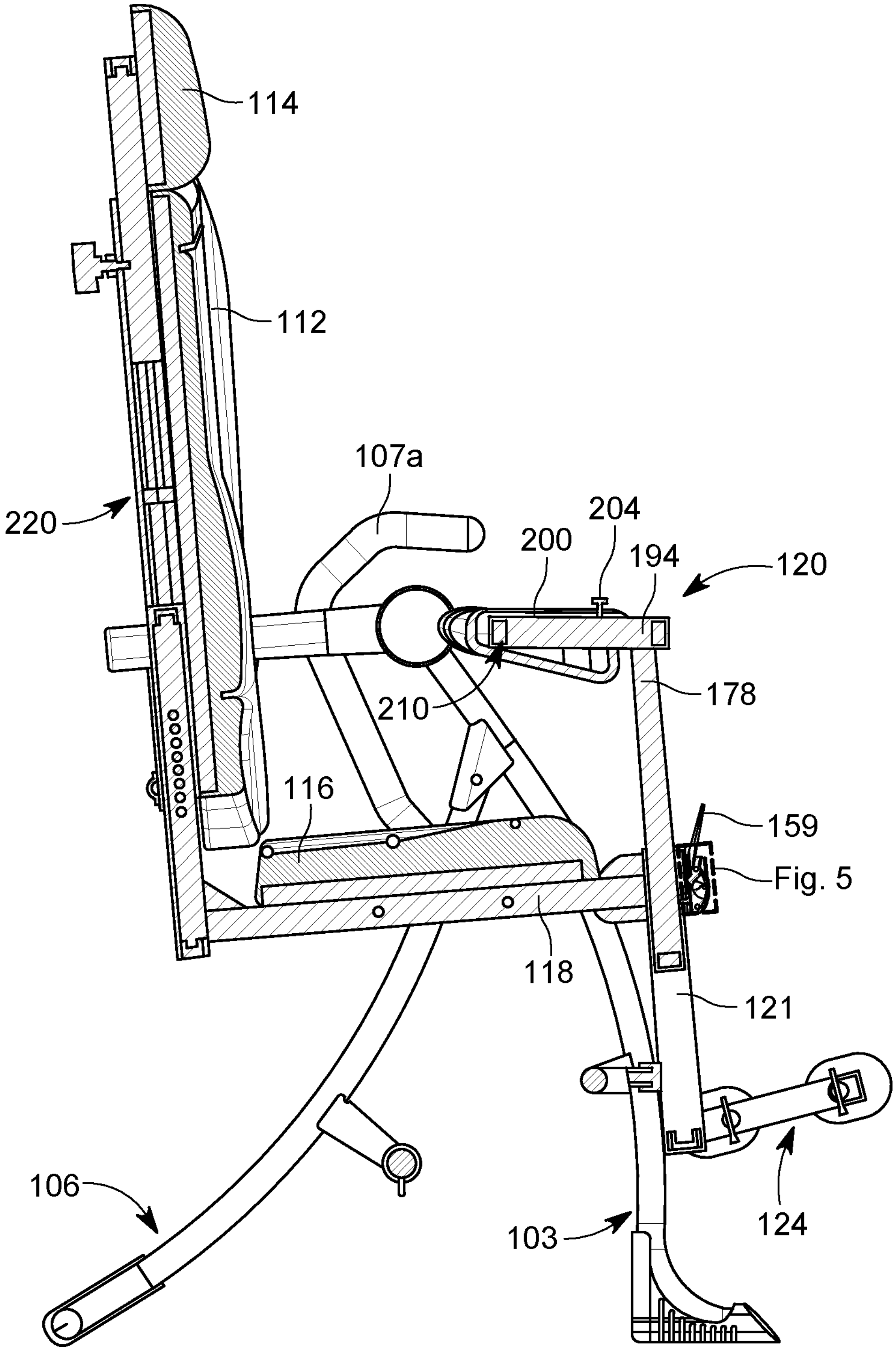
FIG. 4 is a cross-section view of the inversion apparatus shown in FIG. 1 taken along the lines 4-4 in FIG. 3.

In one embodiment, illustrated in FIGS. 1-10, an inversion apparatus 100 includes a frame 102 including a front support 103 and a rear support 106 configured and arranged to support a user support, such as a chair 110, on a frame support, such as a floor F. The chair 110 is pivotally connected to distal ends of the front support 103 with pivot connections 104*a* and 104*b*. Distal ends of the rear support 106 are operatively connected to the front support 103 proximate the pivot connections 104*a* and 104*b*, and handles 107*a* and 107*b* extend upward from the rear support 106. The chair 110 can optionally include position adjusters 113*a* and 113*b* extending from the pivot connections 104*a* and 104*b*, and a back 112 is operatively connected to the position adjusters 113*a* and 113*b*. A head rest 114 is operatively connected to the top of the back 112. A seat 116 is operatively connected to the bottom of the back 112. The seat 116 includes a seat connector 118 configured and arranged to connect to a securing assembly, which in this embodiment is a lap pad assembly 120, as shown in FIG. 4. Although a chair is shown and described in this embodiment, it is recognized that other suitable user supports could be used.

Preferably, the seat connector 118 is operatively connected to a first tube portion 121 of the lap pad assembly 120, preferably by welding or other suitable connection. The first tube portion 121 includes a first end 122 to which a foot support assembly connector 123 is operatively connected, preferably by welding or other suitable connection. A foot support assembly 124 is operatively connected to the foot support assembly connector 123. A second end 126 of the first tube portion 121 includes a slot 128 in its front surface, and the first tube portion 121 includes a cavity or bore 127 extending longitudinally therethrough that is configured and arranged to receive a second tube portion 178. Preferably, the second end 126 is configured and arranged to receive a bushing 126*a* that includes a cavity or bore 127*a* and a slot 128*a* corresponding with those of the second end 126.

An embodiment lock assembly 130 is operatively connected to the second end 126 proximate the slot 128. The lock assembly 130 includes a mounting bracket 131, a position lock pawl 143, a biasing member 170, and a safety lock pawl 163. The mounting bracket 131 includes a plate portion 132, which is operatively connected to the front surface above the slot 128, preferably by welding or other suitable connection. Left and right sides 133*a* and 133*b* extend outward from opposing sides of the plate portion 132. The left and right sides 133*a* and 133*b* include aligned apertures 134*a* and 134*b* proximate their tops configured and arranged to receive a shaft 136. Left and right ends 136*a* and 136*b* of the shaft 136 extend outward from the sides 133*a* and 133*b*, and an intermediate portion 136*c* extends between the sides 133*a* and 133*b*. Proximate the bottoms of the left and right sides 133*a* and 133*b* are protrusions 138*a* and 138*b*, which form notches 137*a* and 137*b* between the protrusions 138*a* and 138*b* and portions of the sides 133*a* and 133*b* supporting the shaft 136. The protrusions 138*a* and 138*b* include apertures 139*a* and 139*b* configured and arranged to receive fasteners 172*a* and 172*b*.

The shaft 136 is configured and arranged to be inserted through a bore 146 of the position lock pawl 143. The bore 146 extends through a pivot portion 145 of the position lock pawl 143. An extension 147 extends upward from the pivot portion 145, and an intermediate portion 153 interconnects the pivot portion 145 and a lock portion 149. The intermediate portion 153 includes a first extension 154 extending downward and forming a radiused surface 155 between its distal end and a second extension 156, which is proximate the middle of the intermediate portion 153. The second extension 156 forms a first engaging surface 157*a* on its side proximate the pivot portion 145 and a second engaging surface 157*b* on its side proximate the radiused surface 155 of the first extension 154. The lock portion 149 includes protrusions 150*a* and 150*b*, which have engaging surfaces 151*a* and 151*b* and sliding surfaces 152*a* and 152*b*. A pawl release lever 159 includes a bore 160 configured and arranged to receive the extension 147 and a handle 161 extends upward from the extension 147. The position lock pawl 143 is shown in at least FIGS. 2A and 5.

The biasing member 170 is generally U-shaped and includes an intermediate portion 170*c* interconnecting a left end 170*a* and a right end 170*b*. The left and right ends 170*a* and 170*b* are configured and arranged to engage the left and right ends 136*a* and 136*b*, respectively, of the shaft 136 and the intermediate portion 170*c* is configured and arranged to extend through the notches 137*a* and 137*b* and contact the first engaging surface 157*a* of the position lock pawl 143 to bias the position lock pawl 143 so that the lock portion 149 extends through the slots 128 and 128*a*. For example, the left and right ends 170*a* and 170*b* could include coiled portions configured and arranged to receive the ends 136*a* and 136*b* of the shaft 136 and distal ends extending from the coiled portions could contact the first tube portion 121 to assist in providing the biasing force. It is recognized that any suitable biasing member could be used.

The safety lock pawl 163 is pivotally connected to the protrusions 138*a* and 138*b* with the fasteners 172*a* and 172*b*. The safety lock pawl 163 is generally U-shaped with left and right side plates 164*a* and 164*b* interconnected by a connecting portion 168 and includes a pivot portion 164 and an engaging portion 166. The pivot portion 164 has an aperture 165*a* in the left side plate 164*a* and an aperture 165*b* in the right side plate 164*b*. The engaging portion 166 includes a radiused edge 167 in each of the side plates that preferably generally corresponds with a radius of the position lock pawl's radiused surface 155. The fasteners 172*a* and 172*b* extend through the apertures 165*a* and 165*b* and the apertures 139*a* and 139*b* to pivotally interconnect the safety lock pawl 163 to the bracket 131.

Preferably, the lock assembly 130 is mostly contained within a cavity 175 of a housing 174, which preferably includes first and second housing portions 174*a* and 174*b* that mate to form the cavity 175 therebetween. In an embodiment, the pawl release lever 159 extends through an opening in the housing 174 for easy access, and the position lock pawl 143 and the safety lock pawl 163 are contained in the housing 174. The housing 174 can be configured and arranged to prevent the safety lock pawl 163 from pivoting too far away from the position lock pawl 143 thereby ensuring the safety lock pawl 163 can easily pivot to engage the position lock pawl 143.

Figure 1:
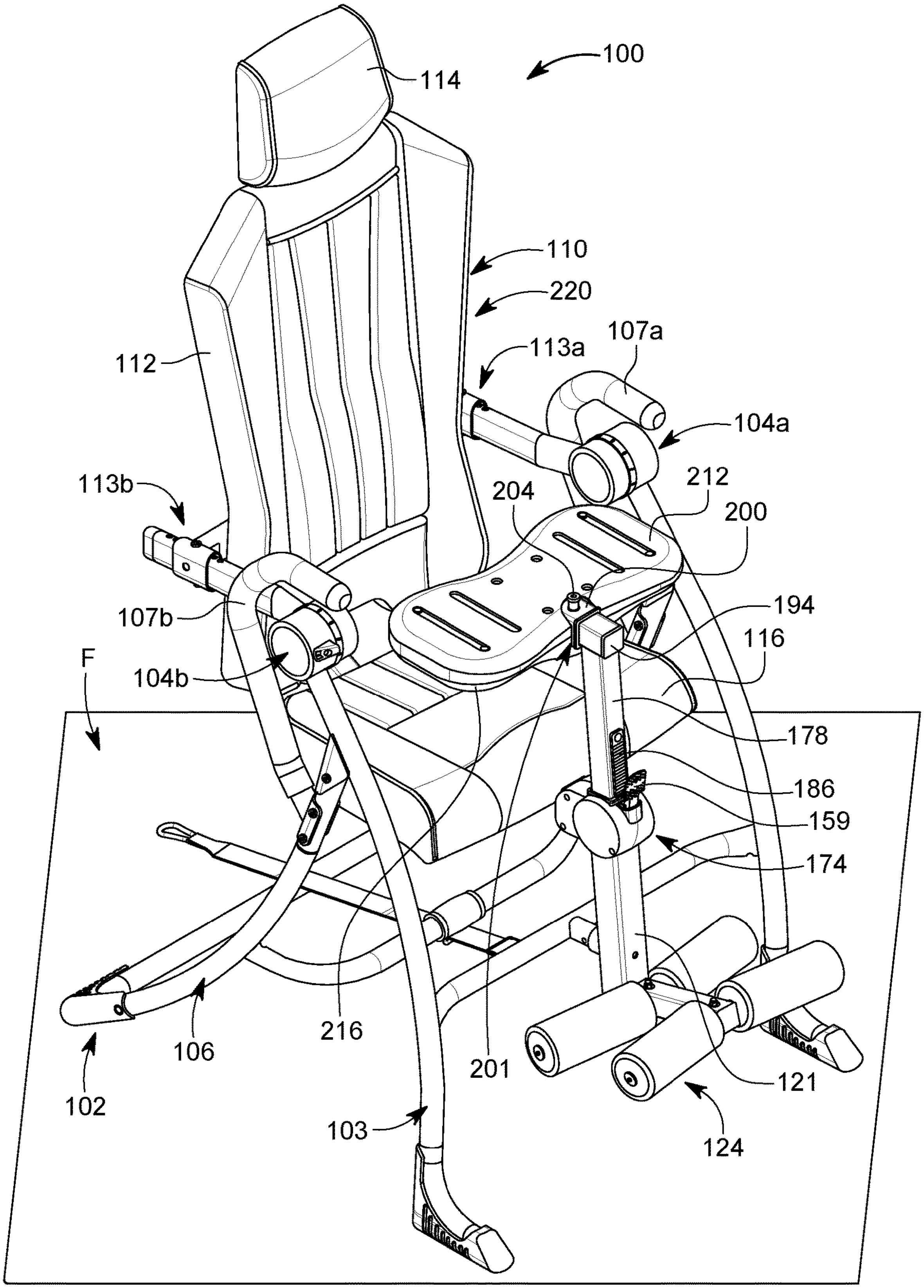
FIG. 1 is a perspective view of an embodiment inversion apparatus constructed in accordance with the principles of the present invention.
Figure 2:
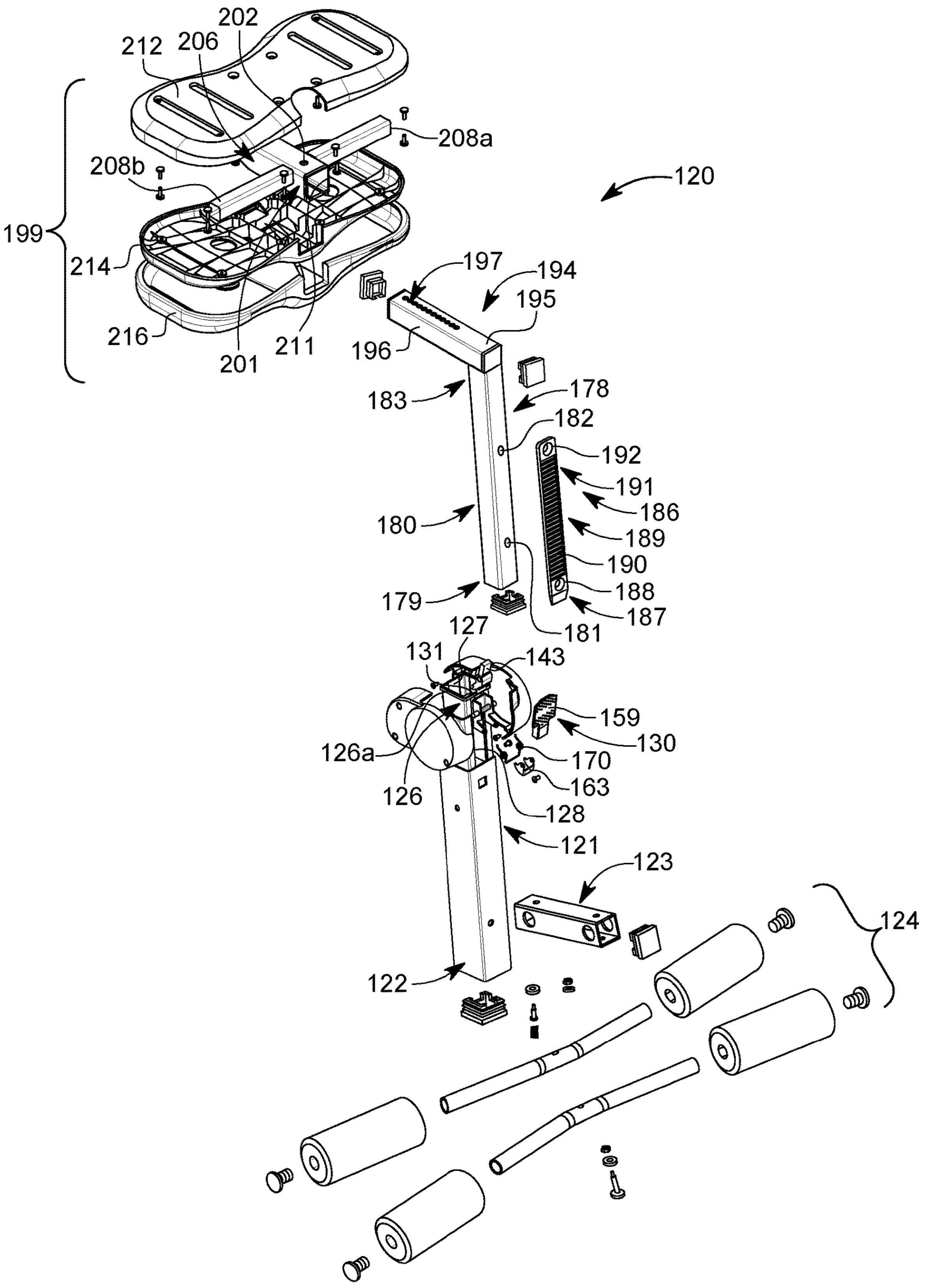
FIG. 2 is an exploded view of a securing assembly of the inversion apparatus shown in FIG. 1.
Figure 2A:
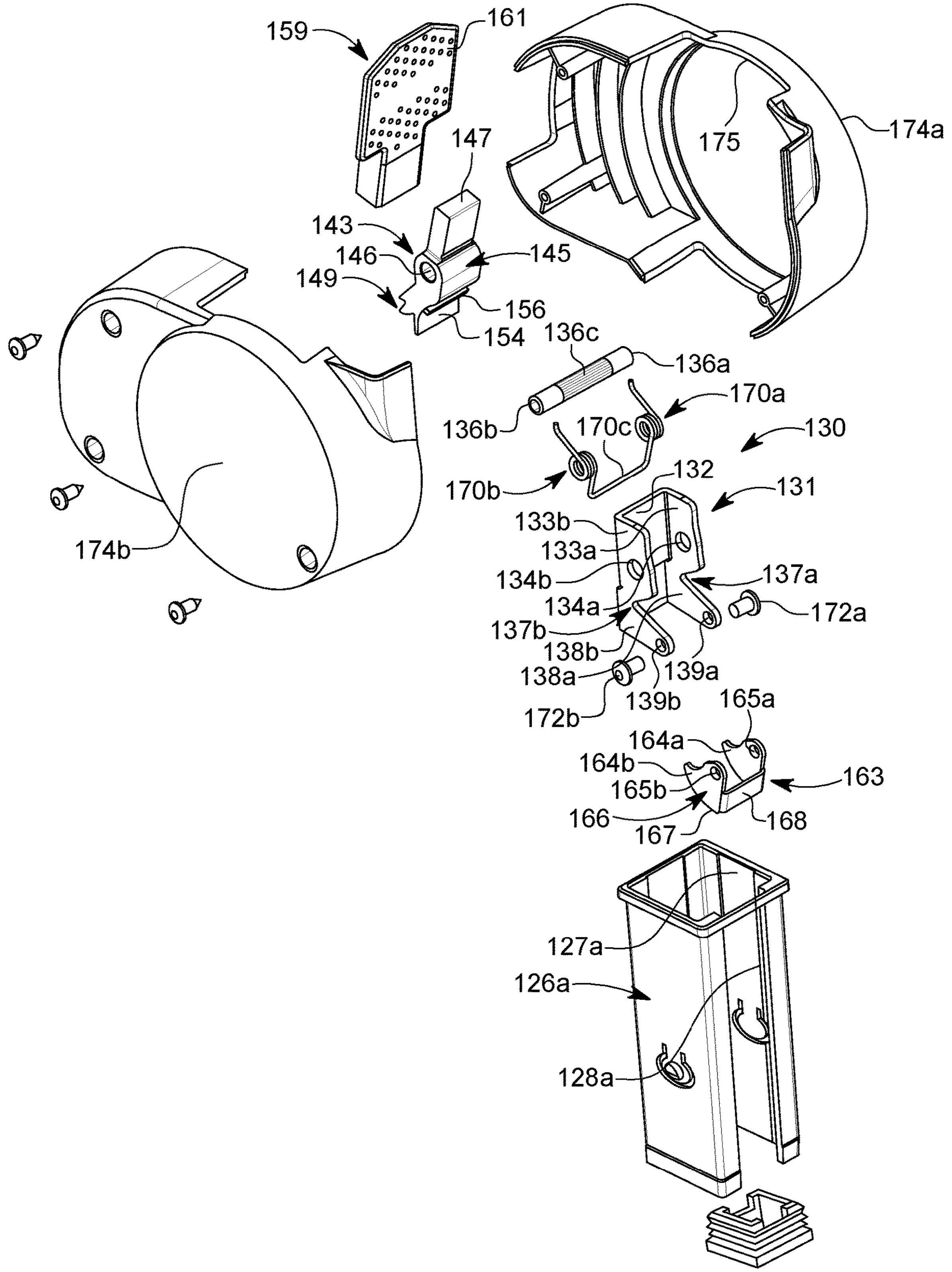
FIG. 2A is an exploded view of a lock assembly of the securing assembly shown in FIG. 2.
Figure 3:
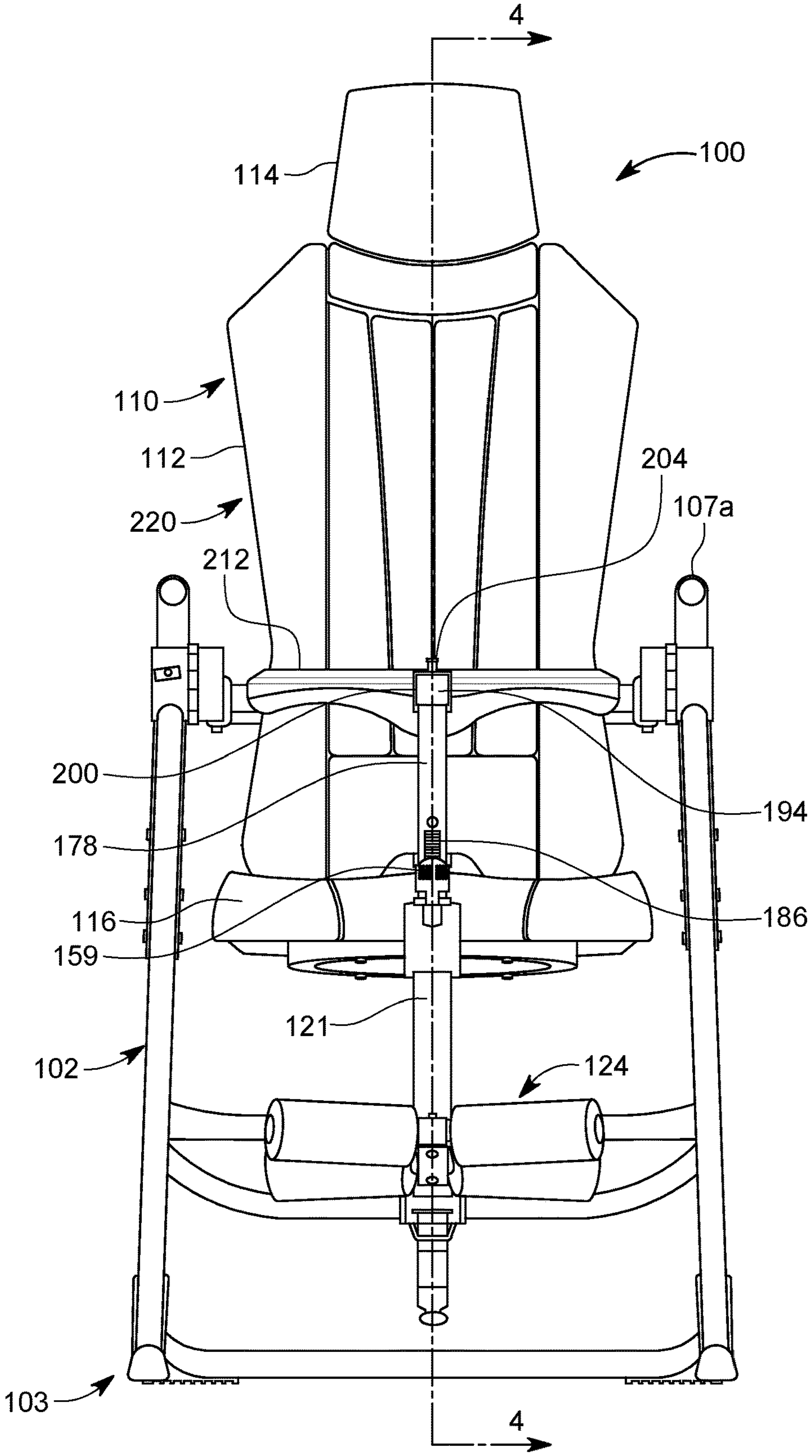
FIG. 3 is a front view of the inversion apparatus shown in FIG. 1.

As shown in FIG. 2, the second tube portion 178 includes an intermediate portion 180 interconnecting first and second ends 179 and 183. The intermediate portion 180 includes a first aperture 181 proximate the first end 179 and a second aperture 182 proximate the second end 183. The first and second apertures 181 and 182 align with apertures 188 and 192 of a ratchet plate or member 186. The ratchet plate 186 includes an intermediate portion 189 interconnecting first and second ends 187 and 191, which include the apertures 188 and 192. The intermediate portion 189 includes a plurality of teeth 190, which include angled surfaces 190*a* and mating surfaces 190*b*. The angled surfaces 190*a* correspond with the sliding surfaces 152*a* and 152*b* of the position lock pawl 143, and the mating surfaces 190*a* and 190*b* correspond with the engaging surfaces 151*a* and 151*b* of the position lock pawl 143. The second tube portion 178 is configured and arranged to slidably move within the first tube portion 121 and, in use, the second end 183 of the second tube portion 178 extends upward from the first tube portion 121 and at least some of the teeth 190 are accessible through the slots 128 and 128*a* in the first tube portion 121 so that the teeth 190 are selectively engaged by the protrusions 150*a* and 150*b* of the position lock pawl 143. A first lap pad connector tube 194 is operatively connected to the second end 183, preferably by welding or other suitable connection, proximate its first end 195. A plurality of adjustment apertures 197 extend along its top surface from approximately its middle to its second end 196.

The first lap pad connector tube 194 is configured and arranged to slidably move within a bore 211 of a second lap pad connector tube 200, which is part of a lap pad 199. The second lap pad connector tube 200 includes a first end 201, an intermediate portion 206, and a second end 210. The first end 201 includes an aperture 202 on its top surface configured and arranged to receive an adjuster knob 204. When the first lap pad connector tube 194 is inserted into the second lap pad connector tube 200, a portion of the adjuster knob 204 extends through the aperture 202 into a desired one of the adjustment apertures 197. Stability members 208*a* and 208*b* extend outward from opposing sides of the second lap pad connector tube 200 proximate the aperture 202. The lap pad 199 includes an upper plate portion 212 and a lower plate portion 214 between which the second lap pad connector tube 200 and stability members 208*a* and 208*b* are positioned, and padding 216 is operatively connected to the lower plate portion 214.

In operation, a user sits on the user support, which in this embodiment is the chair 110, preferably in the upright or loading position 220. The lap pad 199 operatively connected to the second tube portion 178 is preferably removed from the first tube portion 121, to assist in easily accessing and sitting on/getting up from the seat 116 of the chair 110, but it could also be loosened to provide additional room for the user's access to the chair 110. When seated, if not already connected, the user places the first end 179 of the second tube portion 178 into the bore or cavity 127 of the first tube portion's second end 126 (and the bore or cavity 127*a* of the optional bushing 126*a*). To position the padding 216 to contact the user's thighs, the lap pad 199 is simply pushed downward so that the second tube portion 178 is moved further into first tube portion 121.

Figure 5:
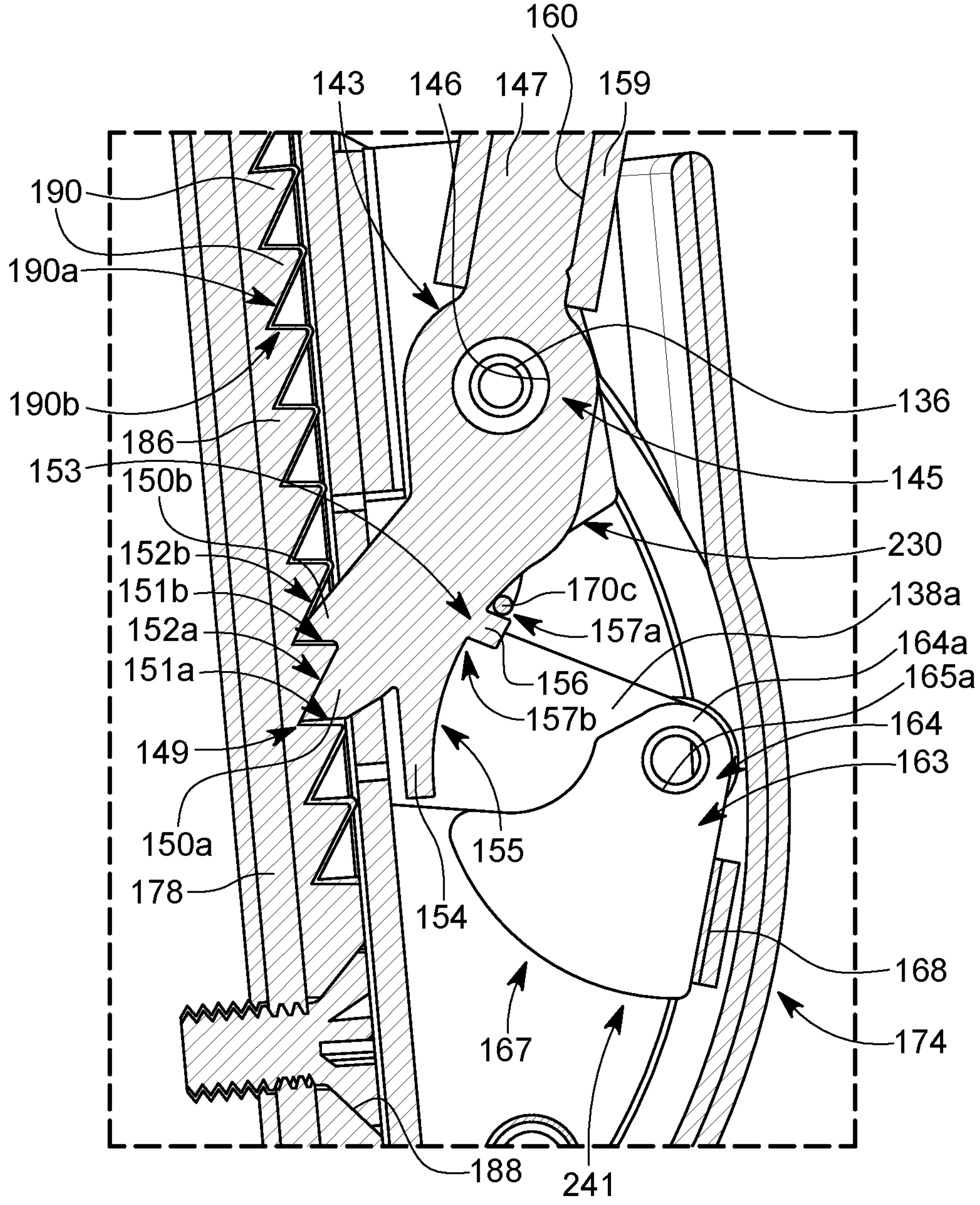
FIG. 5 is a cross-section view of the lock assembly of the inversion apparatus shown in FIG. 4 with a position lock pawl in an engaged position and a safety lock pawl in a disengaged position.
Figure 6:
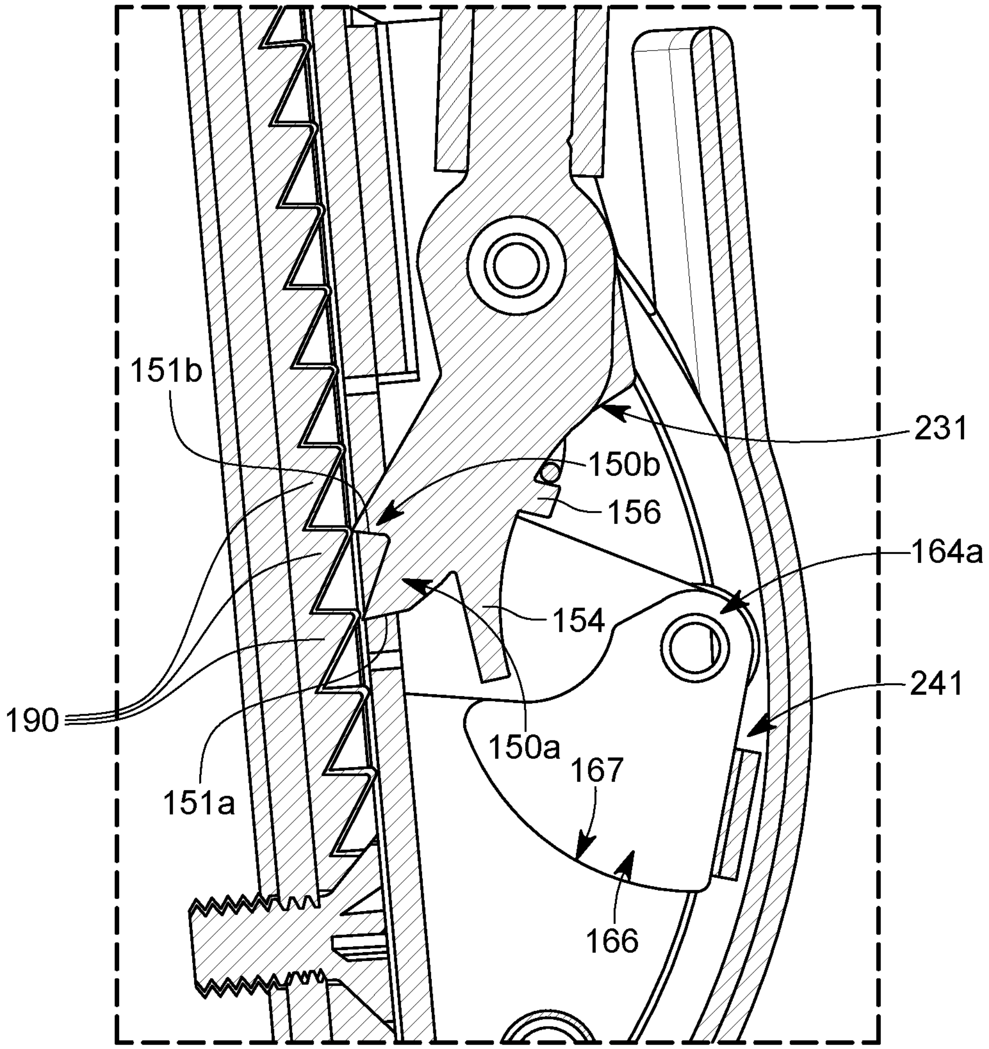
FIG. 6 is a cross-section view of the lock assembly of the inversion apparatus shown in FIG. 4 with the position lock pawl in a disengaged position and the safety lock pawl in a disengaged position.
Figure 7:
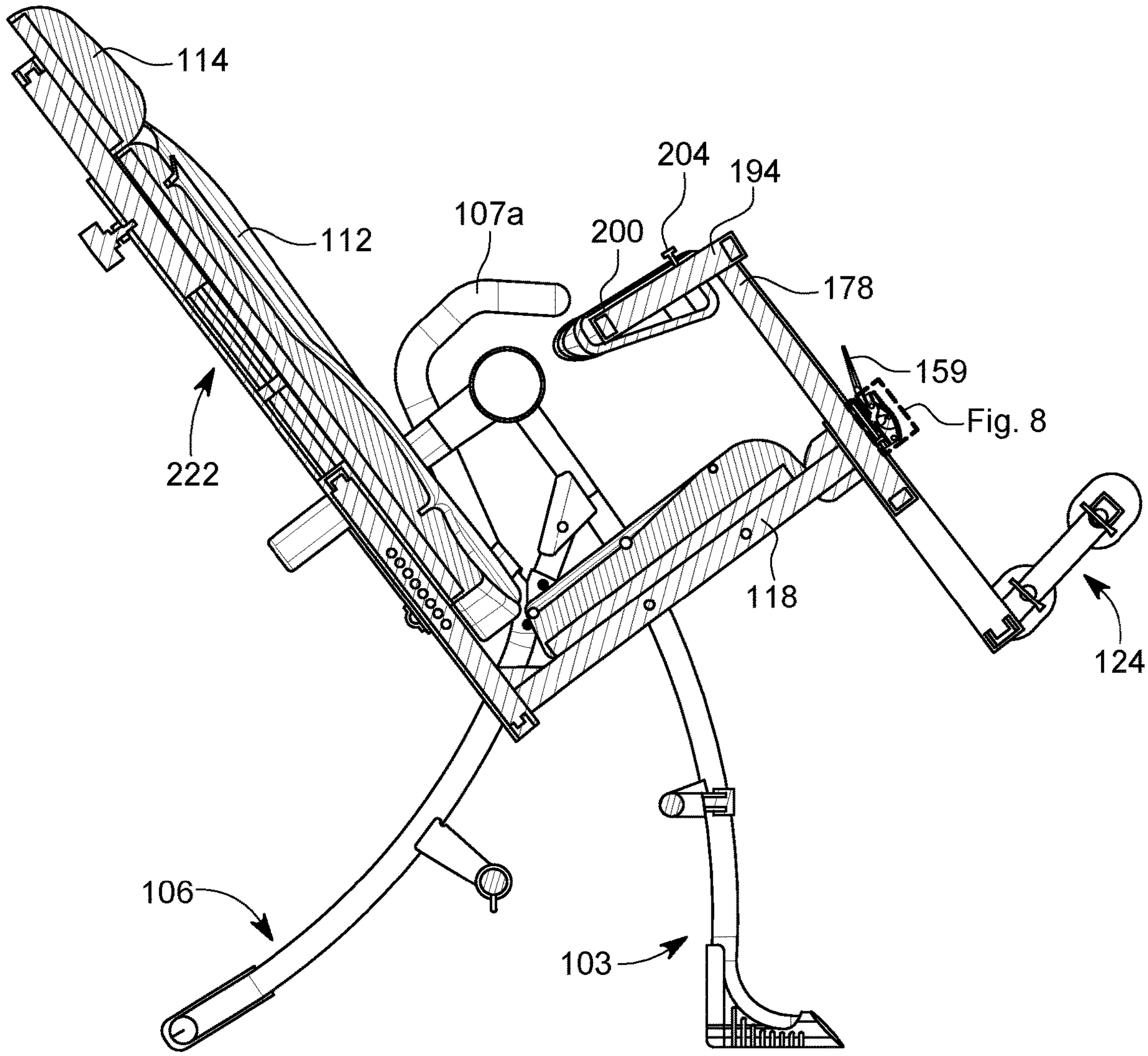
FIG. 7 is a cross-section view of the inversion apparatus shown in FIG. 4 with the inversion apparatus in a partially inverted position.

In the upright or loading position 220, the safety lock pawl 163 hangs freely, in an unlocked position 241, out of the way of the position lock pawl 143. This allows the user to tighten or release the lap pad assembly 120, by moving the second tube portion 178 relative to the first tube portion 121, with ease. As shown in FIG. 5, the housing 174 is configured and arranged to prevent the safety lock pawl 163 from pivoting too far away from the position lock pawl 143. To tighten the lap pad assembly 120 (position the padding 216 preferably against the user's thighs), the user only needs to press downward on the lap pad assembly 120. The protrusions 150*a* and 150*b* of the position lock pawl 143 include sliding surfaces 152*a* and 152*b* configured and arranged slide along the angled or sloped surfaces 190*a* of the teeth 190, which allow the position lock pawl 143 to pivot and clear the teeth 190. Thus, the position lock pawl 143 pivots between engaged and disengaged positions 230 and 231, respectively. The biasing member 170 urges the position lock pawl 143 toward the ratchet member 186 so as the protrusions 150*a* and 150*b* clear the teeth 190, they are biased to engage the adjacent teeth 190. This is repeated until the lap pad 199 is in the desired position. The teeth 190 are configured and arranged to prevent the position lock pawl 143 to pivot when the lap pad assembly 120 is pulled upward. The mating surfaces 190*b* of the teeth 190 contact the engaging surfaces 151*a* and 151*b* and the protrusions 150*a* and 150*b* cannot pivot. Although at least one protrusion could be used to engage at least one tooth, it is preferred that two protrusions are used and preferably engage adjacent teeth.

The distance between the user and the lap pad 199 is easily adjusted by pulling up on the adjuster knob 204, sliding the lap pad 199 relative to the first lap connector tube 194, and releasing the adjuster knob 204 to selectively position part of the adjuster knob 204 in the desired adjustment aperture 197. Once the lap pad assembly 120 is appropriately adjusted relative to the user, the inversion apparatus 100 is then ready to be inverted.

Figure 8:
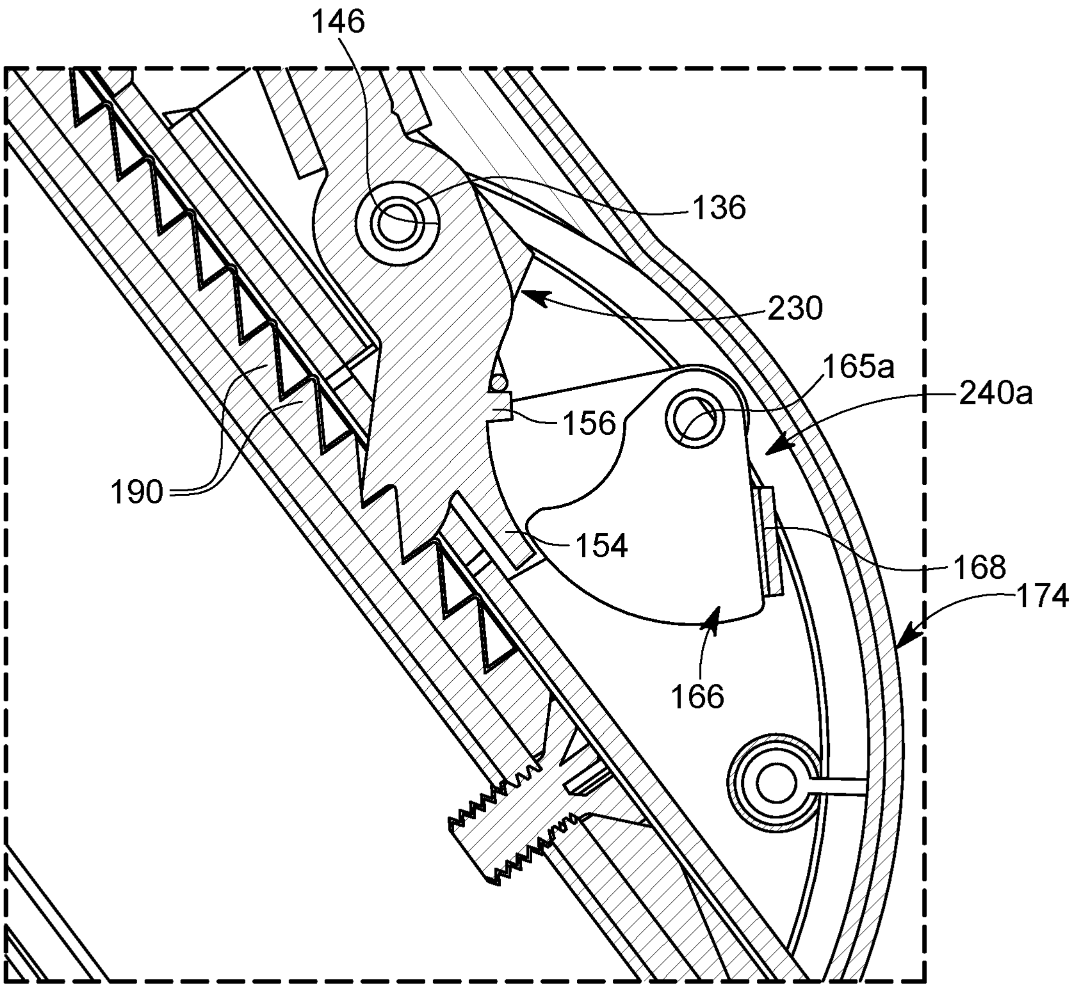
FIG. 8 is a cross-section view of the lock assembly of the inversion apparatus shown in FIG. 7 with the position lock pawl in an engaged position and the safety lock pawl in an engaged position.

As the chair 110 is inverted into a range of inverted positions, the safety lock pawl 163 will begin to pivot relative to the mounting bracket 131. As shown in FIG. 8, when the chair 110 is in an inverted position 222, preferably at about 45 degrees, the safety lock pawl 163 pivots to start engaging the position lock pawl 143. Gravity assists the safety lock pawl 163 in pivoting relative to the mounting bracket 131.

Figure 9:
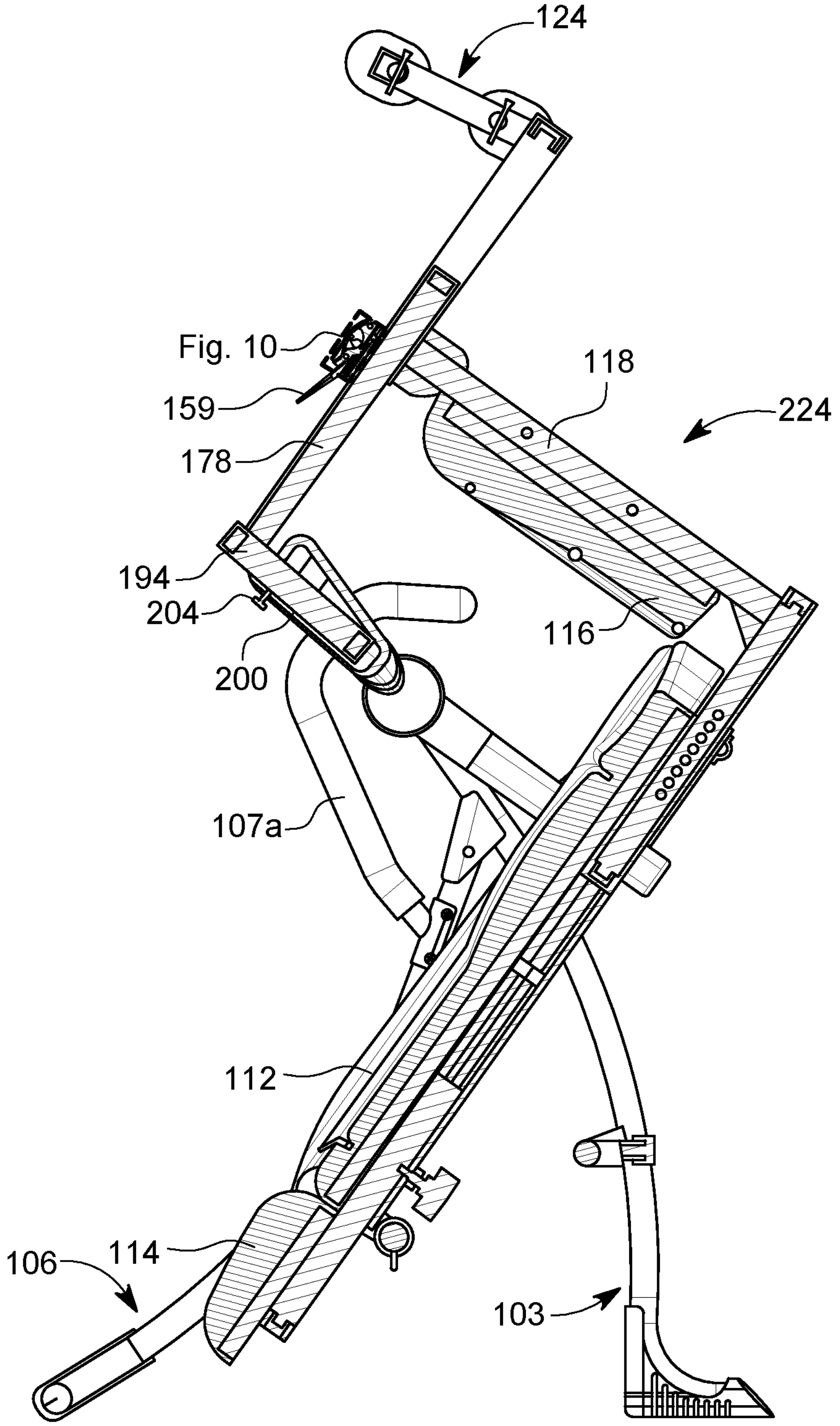
FIG. 9 is a cross-section view of the inversion apparatus shown in FIG. 4 with the inversion apparatus in a desired inverted position.
Figure 10:
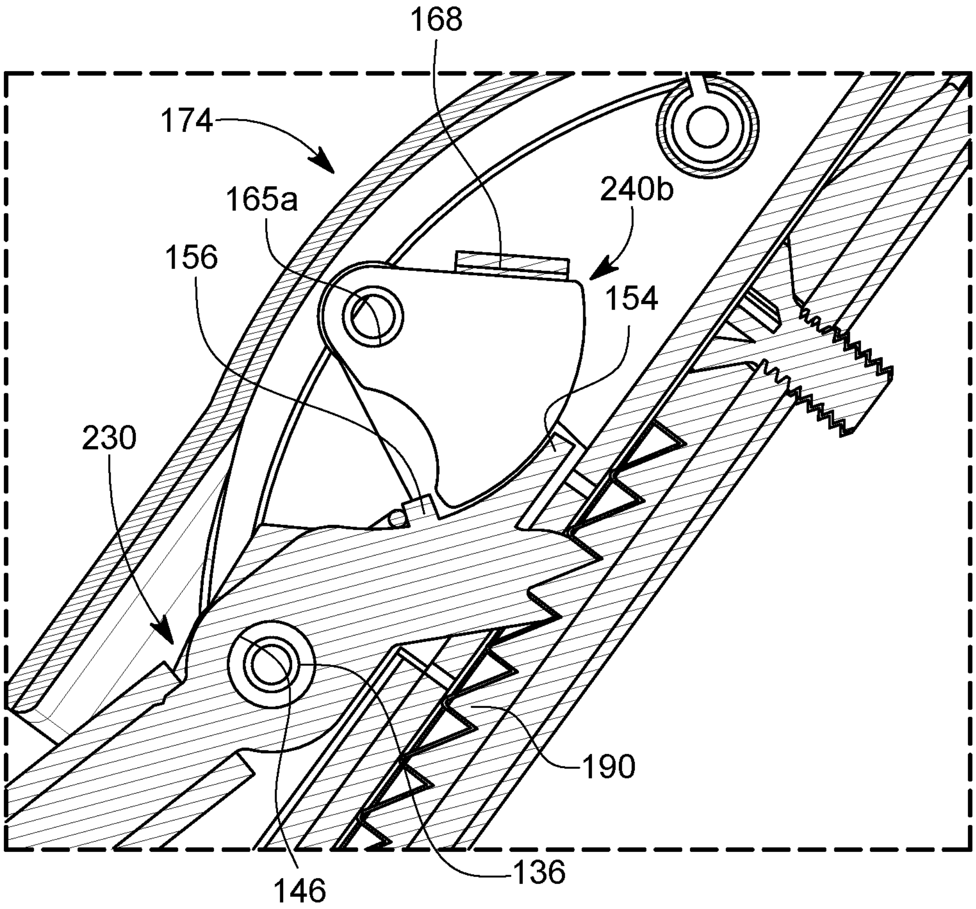
FIG. 10 is a cross-section view of the lock assembly of the inversion apparatus shown in FIG. 9 with the position lock pawl in an engaged position and the safety lock pawl in another engaged position.

As shown in FIGS. 9 and 10, as the chair 110 is inverted more in another inverted position 224, preferably more than about 45 degrees, the safety lock pawl 163 pivots to contact the second engaging surface 157*b* of the second extension 156. From partially engaged (e.g., the radiused edge of the safety lock pawl 163 is positioned proximate at least a portion of the first extension 154 in a partially engaged position 240*a*) to fully engaged (e.g., the safety lock pawl 163 contacts or is positioned proximate the second extension 156 in an engaged position 240*b*) positions, the safety lock pawl 163 prevents the position lock pawl 143 from pivoting from its engaged positions 240*a* and 240*b* into its disengaged position 241. As the chair 110 is pivoted from an inclined position into its upright or loading position 220, the safety lock pawl 163 pivots from its engaged position (its partially engaged position 240*a* to its engaged position 240*b*) into its disengaged position 241.

To release the lap pad assembly 120, the user preferably places slight downward pressure on the lap pad 199, to release pressure between the position lock pawl 143 and the teeth 190, and then moves the pawl lever 159 toward the second tube portion 178 thereby overcoming the force of the biasing member 170 and pivoting the position lock pawl 143 so that the protrusions 150*a* and 150*b* move away from the teeth 190 into the disengaged position 231. The second tube portion 178 can be partially or completely removed from the first tube portion 121 to assist the user in getting into and out of the chair 110. When the pawl lever 159 is released, the biasing member 170 causes the position lock pawl 143 to pivot, moving the protrusions 150*a* and 150*b* through the slot 128 and, if the second tube portion 178 is inserted into the first tube portion 121, to engage the teeth 190.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A lock assembly for use with an inversion apparatus, the inversion apparatus having a securing assembly operatively connected to a user support, the securing assembly having a first tube portion slidably connected to a second tube portion, the second tube portion having a slot providing access to the first tube portion, the user support configured and arranged to move between a loading position and an inverted position, the lock assembly comprising:

a ratchet plate operatively connected to the first tube portion and accessible through the slot in the second tube portion;

a position lock pawl pivotally connected to the second tube portion to selectively engage the ratchet plate through the slot; and a safety lock pawl pivotally connected to the second tube portion, wherein the safety lock pawl does not engage the position lock pawl when the user support is in the loading position and is configured and arranged to pivot relative to the second tube portion as the user support moves from the loading position into the inverted position to engage the position lock pawl when the user support is in the inverted position thereby preventing the position lock pawl from disengaging the ratchet plate when the user support is in the inverted position.

2. The lock assembly of claim 1, further comprising a biasing member interconnecting the second tube portion and the position lock pawl, the biasing member configured and arranged to bias the position lock pawl toward the ratchet plate.

3. The lock assembly of claim 1, further comprising a bracket interconnecting the second tube portion and the position lock pawl.

4. The lock assembly of claim 1, further comprising a bracket interconnecting the second tube portion and the safety lock pawl.

5. The lock assembly of claim 1, further comprising a housing including a cavity in which the position lock pawl and the safety lock pawl are positioned.

6. The lock assembly of claim 5, further comprising a pawl release lever operatively connected to the position lock pawl, wherein at least a portion of the pawl release lever extends outward from the housing.

7. The lock assembly of claim 5, wherein the housing is configured and arranged to prevent the safety lock pawl from pivoting away from the second tube portion.

8. The lock assembly of claim 1, wherein the inverted position is when the user support is angled at least 45 degrees from a support surface.

9. The lock assembly of claim 1, further comprising a foot assembly operatively connected to a first end of the first tube portion and a lap pad operatively connected to a second end of the second tube portion.

10. The lock assembly of claim 1, wherein the position lock pawl includes a radiused surface and the safety lock pawl includes a radiused edge configured and arranged to engage the radiused surface.

11. A method of using a lock assembly with an inversion apparatus, the inversion apparatus having a securing assembly operatively connected to a user support, the securing assembly having a first tube portion slidably connected to a second tube portion, the second tube portion having a slot providing access to the first tube portion, the lock assembly having a ratchet plate operatively connected to the first tube portion and accessible through the slot in the second tube portion, a position lock pawl pivotally connected to the second tube portion to selectively engage the ratchet plate through the slot, and a safety lock pawl pivotally connected to the second tube portion, the user support configured and arranged to move between a loading position and an inverted position, the method comprising:

sitting on the user support;

pushing the first tube portion into the second tube portion in a first direction thereby causing the position lock pawl to pivot and move relative to teeth of the ratchet plate to a desired position on the ratchet plate, wherein the ratchet plate and the position lock pawl are configured and arranged to allow the first tube portion to move in the first direction and prevent the first tube portion to move in an opposite second direction; and moving the user support from the loading position into the inverted position, wherein the safety lock pawl does not engage the position lock pawl when the user support is in the loading position and is configured and arranged to pivot relative to the second tube portion as the user support moves from the loading position into the inverted position to engage the position lock pawl when the user support is in the inverted position thereby preventing the position lock pawl from disengaging the ratchet plate when the user support is in the inverted position.

12. The method of claim 11, wherein when the user support is angled at least 45 degrees from a support surface, the safety lock pawl pivots to engage the position lock pawl thereby preventing the position lock pawl from disengaging the ratchet plate.

13. The method of claim 11, wherein a pawl release lever is operatively connected to the position lock pawl, further comprising pushing down on the first tube portion to release an engaging surface of the position lock pawl from a mating surface of the ratchet member teeth and moving the pawl release lever to pivot the position lock pawl away from the ratchet member thereby allowing the first tube portion to move in the second direction.

14. An inversion apparatus, comprising:

a user support;

a securing assembly operatively connected to the user support, the securing assembly having a first tube portion slidably connected to a second tube portion, the second tube portion having a slot providing access to the first tube portion, the user support configured and arranged to move between a loading position and an inverted position;

a ratchet plate operatively connected to the first tube portion and accessible through the slot in the second tube portion;

a position lock pawl pivotally connected to the second tube portion to selectively engage the ratchet plate through the slot; and a safety lock pawl pivotally connected to the second tube portion, wherein the safety lock pawl does not engage the position lock pawl when the user support is in the loading position and is configured and arranged to pivot relative to the second tube portion as the user support moves from the loading position into the inverted position to engage the position lock pawl when the user support is in the inverted position thereby preventing the position lock pawl from disengaging the ratchet plate when the user support is in the inverted position.

15. The inversion apparatus of claim 14, wherein the user support includes a seat and a back and the securing assembly includes a lap pad configured and arranged to contact a user's thighs.

16. The inversion apparatus of claim 14, further comprising a biasing member interconnecting the second tube portion and the position lock pawl, the biasing member configured and arranged to bias the position lock pawl toward the ratchet plate.

17. The inversion apparatus of claim 14, further comprising a bracket interconnecting the second tube portion and the position lock pawl.

18. The inversion apparatus of claim 14, further comprising a bracket interconnecting the second tube portion and the safety lock pawl.

19. The inversion apparatus of claim 14, further comprising a housing including a cavity in which the position lock pawl and the safety lock pawl are positioned, wherein the housing is configured and arranged to prevent the safety lock pawl from pivoting away from the second tube portion.

20. The inversion apparatus of claim 14, wherein the inverted position is when the user support is angled at least 45 degrees from a support surface.

21. The inversion apparatus of claim 14, further comprising a foot assembly operatively connected to a first end of the first tube portion and a lap pad operatively connected to a second end of the second tube portion.

22. The inversion apparatus of claim 14, wherein the position lock pawl includes a radiused surface and the safety lock pawl includes a radiused edge configured and arranged to engage the radiused surface.

* * * * *